United States Patent Office 3,389,818
Patented June 25, 1968

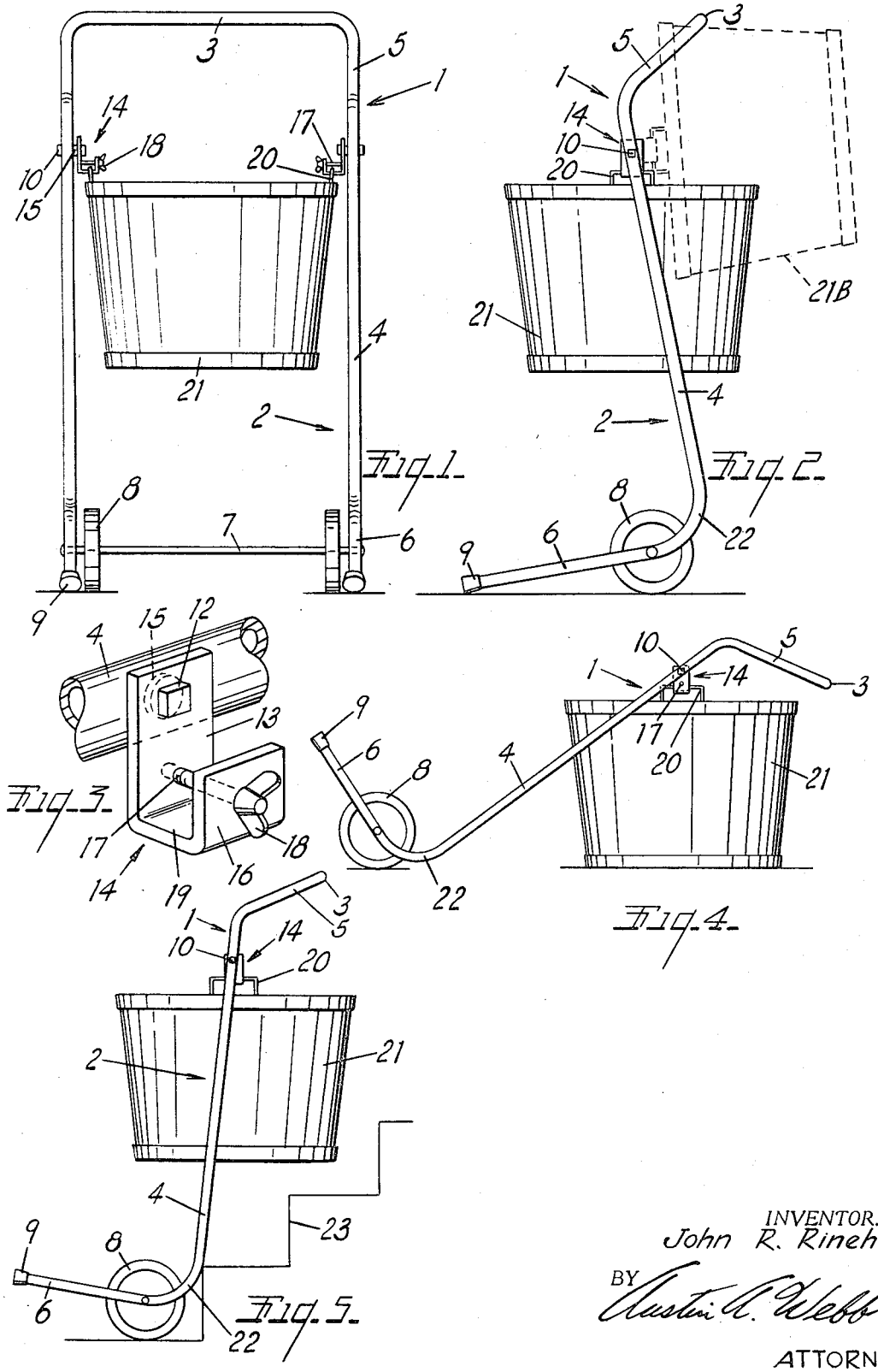

3,389,818
UTILITY CART OR BASKET CARRIER
John R. Rinehart, 426 Bellevue Place,
Kalamazoo, Mich. 49007
Filed Apr. 13, 1966, Ser. No. 542,288
5 Claims. (Cl. 214—372)

This invention relates to improvements in utility cart or basket carrier. The principal objects of the invention are:

Frst, to provide a wheeled cart for transporting a container such as a bushel basket in upright position with the operating handle at various levels relative to the supporting wheels.

Second, to provide a wheeled carrier which will stand and support a container at ground level, or at an elevated position.

Third, to provide a wheeled carrier with a pivotal and removable support for a basket-like container arranged so that the container may be either inverted for dumping its contents, supported in various positions on the carrier, or removed from the carrier.

Fourth, to provide a carried for a basket-like container that is particularly useful for home laundry or lawn work for transporting and supporting laundry in various convenient positions, or for picking up, transporting and dumping leaves and lawn trash.

Fifth, to provide a carrier having the foregoing properties which is simple and inexpensive to make, yet rugged and effective in use.

Other objects and advantages of the invention will be apparent from a consideration of the following description and claims. The drawings, of which there is one sheet, illustrate a highly practical form of the carrier of the invention.

FIGURE 1 is a front elevational view of the carrier with a basket container supported thereon in elevated position.

FIGURE 2 is a side elevational view of the carrier and container in the same position as in FIGURE 1.

FIGURE 3 is an enlarged, fragmentary, perspective view of the container support on the carrier.

FIGURE 4 is a side elevational view of the carrier with the container in lowered position.

FIGURE 5 is a side elevational view of the carrier and container in a position of movement relative to a stairway.

The carrier comprises a frame generally indicated at 1 with side members 2 connected at the top by a cross bar or handle 3. The side members have center portions 4 with rearwardly angled handle extensions 5 and forwardly angled foot portions 6. Desirably the handle extensions are turned rearwardly at an angle of approximately 60° from the side sections, while the foot portions are turned forwardly at an angle of about 85° from the side sections.

A cross bar or axle 7 is supported between and connects the foot portions at a point just forwardly of the side sections. A pair of wheels 8 rotatable about the axis of the axle are of a diameter that will locate the rear sides of the wheels forwardly of and below the radius of the angle between the center portions and the foot portions. The foot portions project forwardly to the wheels so as to support the frame with the tops of the center portions just forwardly of a vertical plane through the axle when the carrier is stood upright as in FIGURE 2. The forward ends of the foot portions may have pads or tips 9 thereon.

Passed through the center portions of the side members near the upper ends thereof are pivot pins or bolts 10 having retaining nuts or rivets 12. The pivots 10 hold the outer arms 13 of U-shaped hangers 14, spaced from the center portions by spacer washers 15. The inner arms 16 of the hangers define holes for passing the shanks of retaining screws 17 having wings or finger heads 18. The screws are removably threadedly engaged in tapped holes in the outer arms 13 below the pivots 10.

The bottoms or bights 19 of the hanger receive and support the looped handles 20 of a container such as a bushel basket 21. The container is thus swingably supported to remain upright as the frame is moved and swung on the axle 7.

When stood upright, the cart will support the basket at a convenient level for hanging laundry as shown in FIGURES 1 and 2, or the basket can be inverted as shown by the dotted line position at 21B in FIGURE 2 for dumping lawn trash. When tilted back as in FIGURE 4, the loops 20 will engage the screws 17 to support the handle of the carrier while the basket is loaded at ground level. The carrier moves easily up and down steps as shown in FIGURE 5 as the radius 22 of the side frames engages the edge of steps 23 to slide the frame and wheels up or down until the wheels engage the next step.

The container or basket 21 is easily changed as to substitute a clean basket for laundry, in place of a dirty basket for lawn work so the carrier is easily interchanged for various household uses. The frame 1 is desirably a single integral piece of tubing such as aluminum which makes the carrier easy and inexpensive to manufacture by simply boring holes for the axle 7 and pivots 10, and then bending the tubing. The hangers 14 are simple parts, easily fabricated and assembled, as are the axle and wheels.

What is claimed as new is:
1. A utility carrier for containers comprising,
    a frame having laterally spaced side members connected at the top by a cross handle,
    straight center portions in said side members with rearwardly angled top extensions extending to said handle and forwardly angled foot portions at their lower ends,
    an axle connecting said foot portions toward the rear ends thereof,
    a pair of wheels on said axle having radii terminating short of said center portions,
    U-shaped hanger members pivotally connected to said center portions adjacent to the tops thereof,
    and manually releasable retaining screws engaged through said hanger members below the pivot supports thereof and adapted to releasably retain looped handles of containers within said hanger members.
2. A carrier as defined in claim 1 in which said wheels are between said side members on said axle, and said hanger members are on the opposed inner sides of the side members.
3. A carrier as defined in claim 1 in which said side members and cross handle are formed from an integral piece of tubing.

4. A carrier as defined in claim 3 in which said handle extensions are angled rearwardly about 60° and said foot portions are angled forwardly about 85° from the plane of said center portions.

5. A carrier as defined in claim 4 in which said foot portions and said wheels are proportioned to support said center portions in a forwardly inclined position with said hanger members approximately over said axle when the carrier is supported on a level surface by said wheels and the front ends of said foot portions.

References Cited

UNITED STATES PATENTS 2,636,627   4/1953   Stoker _____ 214—384

FOREIGN PATENTS 499,785   3/1951   Belgium.

GERALD M. FORLENZA, *Primary Examiner.*

ALBERT J. MAKAY, *Examiner.*